Nov. 10, 1925.  
J. S. LANG  
1,561,089  
MEANS FOR ATTACHING SHOCK ABSORBERS TO MOTOR OR OTHER VEHICLES  
Filed April 21, 1923   2 Sheets-Sheet 1

INVENTOR:
James S. Lang
BY
ATTORNEYS.

Nov. 10, 1925.  J. S. LANG  1,561,089
MEANS FOR ATTACHING SHOCK ABSORBERS TO MOTOR OR OTHER VEHICLES
Filed April 21, 1923   2 Sheets-Sheet 2
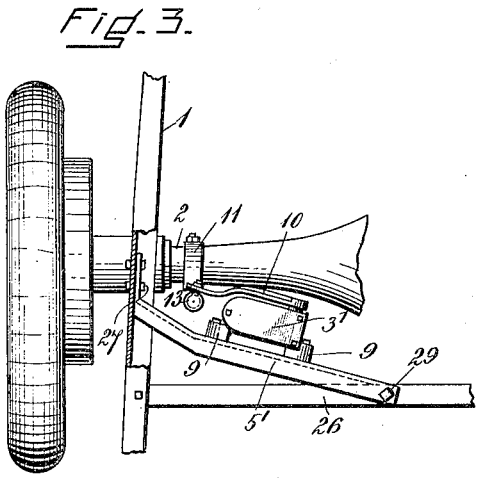
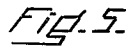
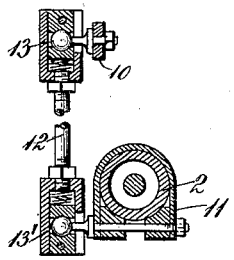
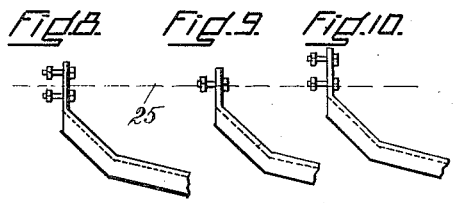
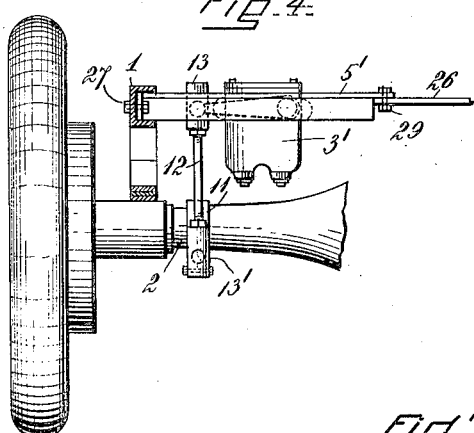
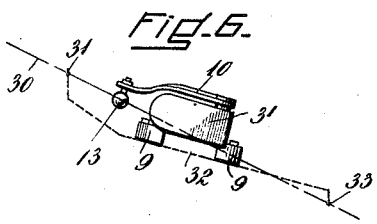
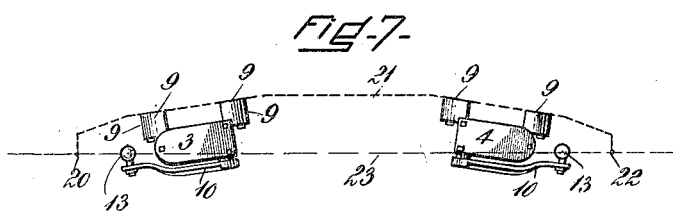
INVENTOR:
James S. Lang
By Cooley Hbayer
ATTORNEYS Patented Nov. 10, 1925.

1,561,089

UNITED STATES PATENT OFFICE.

JAMES S. LANG, OF WATERTOWN, MASSACHUSETTS.

MEANS FOR ATTACHING SHOCK ABSORBERS TO MOTOR OR OTHER VEHICLES.

Application filed April 21, 1923. Serial No. 633,778.

*To all whom it may concern:*

Be it known that I, JAMES S. LANG, of Watertown, in the county of Middlesex and State of Massachusetts, a citizen of the United States, have invented a new and useful Improvement in Means for Attaching Shock Absorbers to Motor or Other Vehicles, of which the following is a full, clear, and exact description, reference being had to the accompanying drawings, forming a part of this specification, in explaining its nature.

The present invention relates to the attachment of that class of shock absorbers in which one of the elements of the shock absorber is attached to some member of the body frame or chassis of the vehicle, and another element attached to the vehicle axle, and especially to those in which the line of the force exerted by the absorber does not coincide with the plane of the attaching surface of the absorber.

One of the objects of the invention is to provide a means of eliminating strain upon the bolts fastening the attachments to the side members of the frame or chassis due to torsion of the attachment member. Another object of the invention is to provide an additional bracing member for the frame or chassis whereby the latter is increased in strength and rigidity instead of being weakened by the attachment of a shock absorber.

Shock absorber attachments embodying my invention can be seen by reference to the accompanying drawings, in which Figure 1 is a horizontal plan of a portion of an automobile chassis with the shock absorber attachment carrying two such shock absorbers.

Fig. 3 is a horizontal plan of a portion of an automobile chassis with a slightly modified type of shock absorber attachment carrying one absorber only.

Fig. 4 is a rear elevation of the shock absorber and attachment shown in Fig. 3.

Fig. 5 shows in more detail a typical means for connecting the shock absorber to the axle of the vehicle.

Fig. 6 is a top view of a shock absorber arranged as shown in Fig. 3 showing diagrammatically the relation of the location of the force exerted by the absorber to the plane of the junction of absorber to the attachment, and to the plane passing through the supports of the attachment.

Fig. 7 is a top view of two shock absorbers arranged as shown in Fig. 1 and showing diagrammatically the relation of the location of the forces exerted by both shock absorbers to the plane of the junction of the absorbers to the attachment, and to the plane passing through the supports of the attachment.

Figs. 8, 9 and 10 show different styles of bolting the attachment to the side member of the car body or chassis in relation to the line in an approximately vertical plane passing through the other support of the attachment and through the locus of the force exerted by the shock absorber.

Referring to the figures by characters of reference, 1 represents a side member of the chassis of an automobile of conventional type, and 2 represents the axle of the same.

Figure 1:
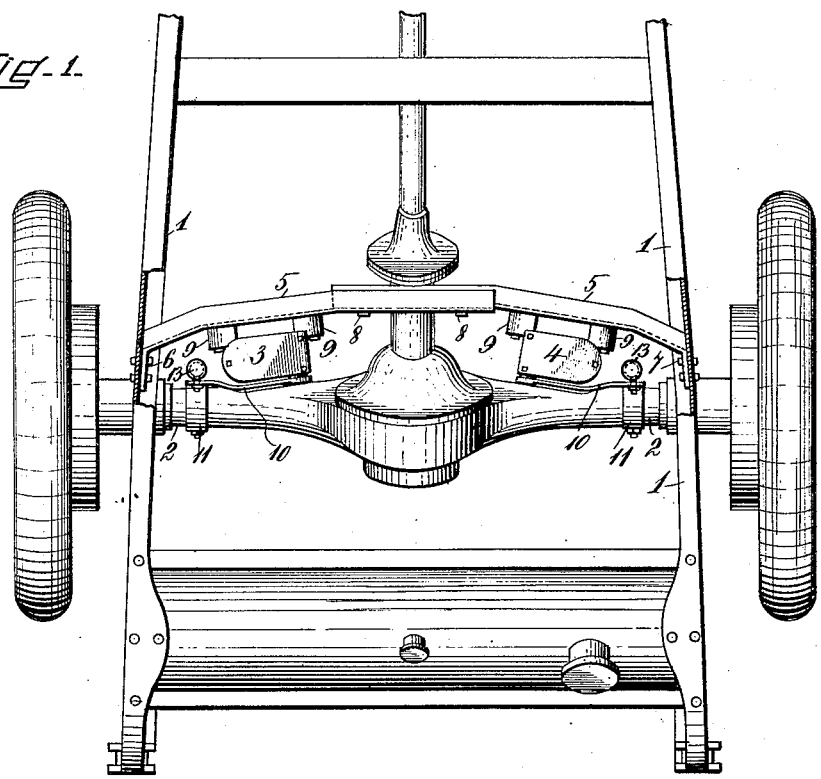
Figure 2:
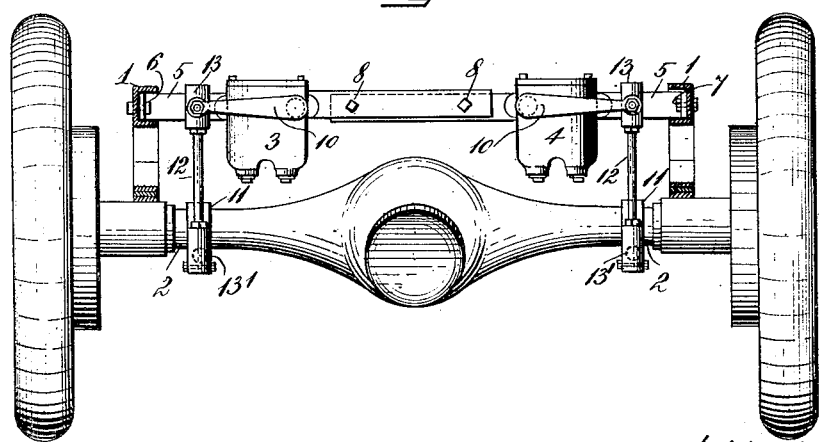
Fig. 2 is a rear elevation showing the shock absorbers and attachments shown in Fig. 1.

Relative movements of member 1 and axle 2 are controlled by shock absorbers 3 and 4 carried by an attachment member 5 shown in Figs. 1 and 2.

The attachment member 5 is bolted to the side members 1 by a suitable bolting at 6 and 7 and forms an additional cross member or brace increasing the rigidity of the frame 1. The member is for convenience in attaching to vehicles of different widths, made in two pieces rigidly bolted together by bolts 8.

Each of the shock absorbers 3 and 4 is provided with lugs 9, 9 by means of which it is secured by bolts 9' to the attaching member 5, and also provided with an external rocker arm 10 which is connected to an axle fitting 11 by a connecting rod 12 which is provided with ball and socket end connections 13 and 13' for that purpose (see Fig. 5).

With this arrangement of parts it is seen that the tendency of the chassis 1 to rebound due to any undue expansion of the vehicle springs 14 is opposed by any resistance to the relative movement of the respective rocker arms 10, 10 and to the shock absorber casings 3 and 4 brought about by the operation of the interior parts of the shock absorbers.

The restraining force thus acting is transmitted from the axle 2 to the frame 1 by way of the axle fittings 11, connections 13 and 13', connecting rod 12, rocker arm 10, absorber casings 3 and 4, bolted lugs 9, attachment member 5 and boltings at 6 and 7.

Referring now to the characteristics of the attachment member 5 with reference to the force transmitted by the rocker arm 10 and the connecting rod 12 as connected by the ball and socket joints 13 and 13'; it will first be noted that the joints 13, 13' move in a plane substantially parallel to and at a distance from the plane in which the lugs 9 are bolted to the attachment member 5. Therefore force exerted upon the joints 13 and 13', which is opposed by the internal resistance of the absorber, is transmitted through the absorber casings and lugs 9 to the member 5 and tends not only to depress this member but also to subject that part of the member opposite the absorber to a torsional stress on account of the distance of the joint from the plane of attachment of the absorber, and this torsional stress is not thrown upon the boltings 6 and 7 in accordance with the principles of the present invention. To explain:—

Referring to Fig. 7, let the broken line 20, 21, 22 represent the rigid member 5 carrying the shock absorbers 3 and 4 and supported at the points 20 and 22 shown as a plan view. The force exerted upon the absorbers is applied at the ball joints 13, 13' and is more or less nearly vertical in direction. If the straight line 23 connecting the supports 20 and 22, passes also through the plane of the ball and socket joints 13, 13', vertical force applied at the latter will not tend to cause any rotation of the member 20, 21, 22, on its supports at 20 and 22 and the latter are relieved of all torsional stress.

The bolting might consist of a single bolt as in Fig. 9 provided the line of applied force passed through it, but in practice not less than two bolts would be used to provide against the effect of inertia and vibration. This is indicated in Figs. 8 and 10 in which 25 represents a line lying in the plane of the load. In practice two bolts rather than one are preferable for the further reason that due to the inclination of the plane of the bolting surface of the lugs 9 to the line of the plane 20, 23, 22, the locus of the load at 13 will have a slight sidewise movement according to the position of the rocker arms 10, 10, and the prolongation of the load line should for maximum efficiency fall within the bolting as shown in Fig. 8 or as an extreme variation as in Fig. 10.

If it is desired to attach the absorbers individually instead of both upon a common support, identical principles will be involved and advantage may be taken of one of the original cross members of the chassis as at 26 (see Figs. 3 and 4). In this arrangement the shock absorber 3' is bolted to an attachment member 5' which has one end bolted to the chassis member 1 at 27 and the other end bolted to the cross member 26 as at 29.

The absorber as before is connected to the axle 2 by means of the rocker arm 10, ball and socket joints 13 and 13', connecting rod 12 and axle fitting 11, and the rebound of the chassis is restrained the same as before by the action of the interior parts of the absorber.

The analysis of the forces in this case of the individual absorber upon the separate attachment member 5' is identical with the case first explained as is seen from the diagram shown in Fig. 6. In this diagram the locus of the load lies at 13 in the plane represented by the straight line 30 connecting the supporting points 31 and 33 of the rigid member 5' represented by line 31, 32, 33, and on account of this condition vertical force applied at 13 will not tend to rotate the member 5' upon its supports, and the latter will therefore be relieved of stress.

Having thus fully described my invention, I claim and desire to secure by Letters Patent of the United States:—

1. The combination with the frame and axle of a vehicle, of a shock absorber having an external rocker arm, means connecting the rocker arm to the axle of the vehicle, an attaching member for the shock absorber to which it is secured, said member being formed and arranged whereby it will extend between and be attached to the frame at separate points so located that the locus of force exerted by the shock absorber during the functioning thereof will lie substantially within a plane passing through said points, and means for attaching said member to the frame at said respective points.

2. The combination with the frame and axle of a vehicle, of a shock absorber having an external rocker arm, means connecting the rocker arm to the axle of the vehicle and making a flexible jointed connection with said arm, an attaching member for the shock absorber to which it is secured, said member being formed and arranged whereby it will extend between and be attached to the frame at separate points so located that said flexible jointed connection between said arm and the means connecting it to the axle of the vehicle will lie substantially within a plane passing through said points, and means for attaching said member to the frame at said respective points.

JAMES S. LANG.